United States Patent [19]
Bettini

[11] Patent Number: 5,536,030
[45] Date of Patent: Jul. 16, 1996

[54] STEERING DETECTION DEVICE FOR ARTICULATED VEHICLES

[76] Inventor: Marco Bettini, Via della Pace, 7 Fr. San Marino, Bentivoglio (Bologna), Italy, 40010

[21] Appl. No.: 424,665
[22] Filed: Apr. 18, 1995
[30] Foreign Application Priority Data Apr. 21, 1994 [IT] Italy ................... BO94A0174

[51] Int. Cl.⁶ .................................................. B62D 53/08
[52] U.S. Cl. .......................................... 280/433; 280/426
[58] Field of Search ............................ 280/426, 423.1, 280/433, 442, 432

[56] References Cited

U.S. PATENT DOCUMENTS

| 5,026,085 | 6/1991 | Ducote | 280/426 |
| 5,123,669 | 6/1992 | Ducote | 280/426 |
| 5,201,836 | 4/1993 | DeWitt | 280/426 |
| 5,232,238 | 8/1993 | Ducote | 280/426 |

FOREIGN PATENT DOCUMENTS

| 1957662 | 5/1971 | Germany . | |
| 3333526 | 4/1984 | Germany | 280/433 |
| BO92A0264 | 7/1992 | Italy . | |

Primary Examiner—Kevin T. Hurley
Attorney, Agent, or Firm—Darby & Darby

[57] ABSTRACT

A steering detection device for articulated vehicles, such as consisting of a tractor truck and a semitrailer, connected by a thrust bearing on the truck and having a hole designed to house a corresponding pin on the semitrailer, creating an axis of relative rotation between the tractor truck and the semitrailer. The device has a shaft rotatably mounted to the pin, a sensor connected to the shaft to interact with the thrust bearing when the tractor truck is coupled to the semitrailer, and a transducer actuated by the rotatable shaft to produce electric signals corresponding to the angular rotational movements between the shaft attached to the thrust bearing by means of the said sensor, and the pin, in order to obtain signals relative to the rotation of the tractor truck with respect to the semitrailer.

12 Claims, 2 Drawing Sheets

STEERING DETECTION DEVICE FOR ARTICULATED VEHICLES

BACKGROUND OF THE INVENTION

The present invention relates to a steering detection device for articulated vehicles which consists of drive means, or a tractor truck, which tows a semitrailer.

To allow medium and large articulated vehicles greater maneuverability, self-steering axles are currently widely used, that is to say, a pair of wheels with the relative supporting axle attached to the rear wheels, and which are self-steering when the lorry moves forwards.

Problems arise with these types of axles when the articulated vehicle must effect reversing maneuvers during which, on the free axle at the rear of the vehicle, understeering may arise, blocking the vehicle during the maneuver.

Two different solutions were examined in order to eliminate this fault on the self-steering axle. The first solution simply locks the axle in a set position, whilst the second, more technologically advanced, causes a controlled movement of the axle wheels even as the articulated vehicle or lorry reverses.

The first solution envisages that the self-steering axle be equipped with a locking device (mechanical—hydraulic), activated at the moment in which the reverse gear is engaged on the tractor truck, or more often by the driver (a pin is inserted in a corresponding hole made in the axle). The locking must be effected with the wheels in the normal forward position. However, this solution does not satisfy the maneuverability requirements of articulated vehicles, since not only is wear on the tires of the self-steering axle increased, but there are always parts which create friction on the blocked wheels, giving rise to errors in the steering direction of the articulated vehicle or lorry.

In contrast, the second solution, designed by the Applicant named herein (see patent application ITBO 92A000264), envisages that the self-steering axle be equipped with a hydraulic drive unit (a twin action piston) which acts upon the axle wheels. In this solution, the unit is controlled by an electrical-hydraulic control unit, connected to the reverse control of the articulated vehicle or lorry so that it is activated only when the vehicle is put into reverse (that is to say, the axle remains passive during forward movement, and becomes active during reversing), and acts upon the piston chambers, allowing the self-steering axle wheels to move in the same way as the front wheels of the tractor truck. The synchronization of the tractor truck front wheels and those of the self-steering axle is controlled by a pair of detectors (linear transducers) which are connected to both steering axles and act upon the control unit which drives the self-steering axle. The use of transducers able to detect the steering angle of the controlled axle allows an exact reading of the effective angle (rather than the estimated angle). Thus, if the desired steering angle is not reached, for example due to obstacles to the wheels, upon removal of the impediment it does not prevent the wheels from positioning themselves at the said desired angle, since it is the transducer which "reads" the effective position and controls the hydraulic control unit.

This solution has proven to be technically reliable, although it has been noticed that while it is not difficult to fit linear transducers on normal lorries (on which they are attached to the axles of the directional wheels), on articulated vehicles of the tractor truck-semitrailer type the linear transducer which reads the tractor truck angle must be fitted between the tractor truck and the semitrailer.

The most suitable control point is the rotating restraint between the tractor truck and semitrailer (which replaces the lorry's front steering axle), which consists of a thrust bearing which acts as a joint between the tractor truck and semitrailer during maneuvers. However, technical difficulties prevent the fitting of the said linear transducer at this point, due both to its size (the transducer must be fitted in the extremely limited space between the thrust bearing and semitrailer), and to the fact that the angle of movement available to the tractor truck is, theoretically, much greater than that of the semitrailer and cannot be controlled by normal linear transducers.

SUMMARY OF THE INVENTION

The Applicant has designed a steering detection device for articulated vehicles of the type described above, that is to say, consisting of a tractor truck which tows a semitrailer having at least one self-steering axle, joined by a thrust bearing on the said tractor truck and having a hole designed to house a pin on the semitrailer, creating an axis of relative rotation between the -tractor truck and the semi-trailer. The device according to the design has a shaft, attached to the pin in such a way that it may rotate freely, to which a sensor may be fitted, designed to interact with the thrust bearing when the tractor truck is attached to the semitrailer. A transducer is fitted between the shaft and the pin, designed to transform into electric signals the angular movements relative to the rotation between the shaft which is attached to the thrust bearing by means of the said sensor, and the pin, in order to obtain signals relative to the rotation between the tractor truck and semitrailer which can be used to check the steering of at least the said self-steering axle.

The object of the present invention is to eliminate the disadvantages described above.

BRIEF DESCRIPTION OF THE DRAWINGS

The technical features and advantages of the present invention, in accordance with the aforementioned objects, will now be described in detail with reference to the accompanying drawings which illustrate an embodiment by way of example only and in which.

DESCRIPTION OF THE PREFERRED EMBODIMENTS

Figure 1:
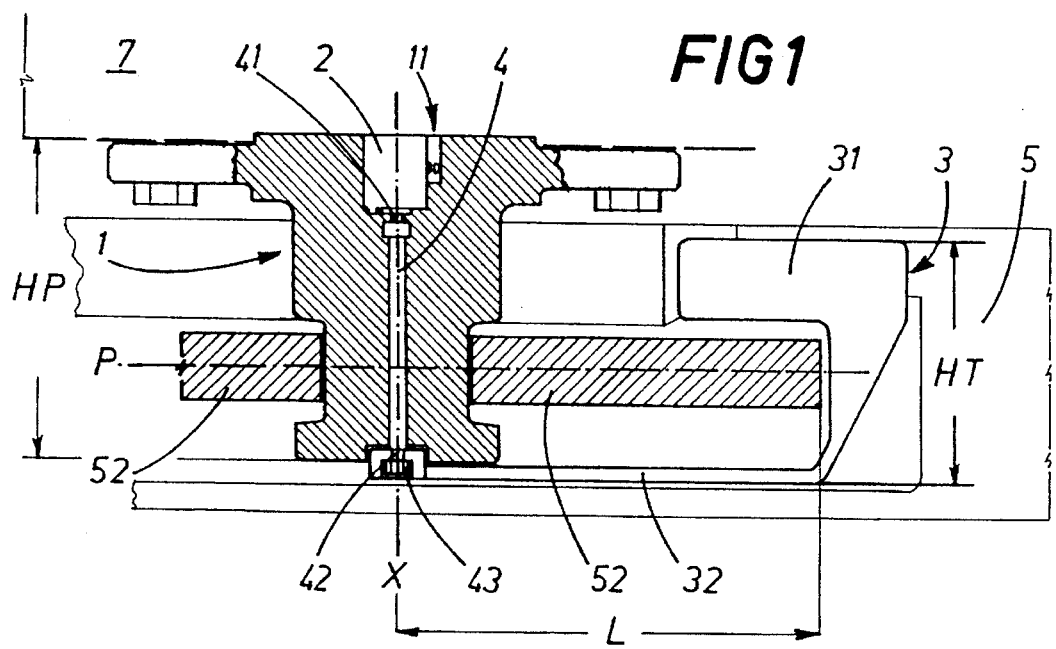
FIG. 1 is a schematic side view with some parts cut away of an embodiment of the present invention.

In accordance with the accompanying drawings, a steering detection device is for articulated vehicles such as a tractor truck and a semitrailer with at least one self-steering axle.

The accompanying drawings show only a lower portion of the front end of a semitrailer 7 connected in this way.

The tractor truck and the semitrailer 7 are attached by means of a thrust bearing 5 present on the tractor truck and having a hole designed to house a corresponding pin 1 on the semitrailer.

The pin 1 may be fitted to the semitrailer in several ways (flanged, bolted, etc.), although the shape of the pin's lower portion, to be connected to the thrust bearing, is always the same, allowing compatibility between the tractor truck and different semitrailers, respecting established standard sizes.

The pin 1 defines an X-axis of relative rotation between the tractor truck and the semitrailer.

The device includes of a shaft 4, attached to the pin 1 in such a way that it may rotate freely, to which a sensor 3 may be fitted, designed to interact with the thrust bearing 5 when the tractor truck is attached to the semitrailer, and of a transducer 2 fitted between the pin 1 and the shaft 4, designed to transform into electric signals the angular movements relative to the rotation between the shaft 4 which is attached to the thrust bearing 5 by means of the said sensor 3, and the pin 1, in order to obtain signals relative to the rotation between the tractor truck and semitrailer which can be used to check the steering of at least the self-steering axle of the semitrailer.

In the illustrated embodiments, the shaft 4 is positioned inside and coaxial to the pin 1, and corresponds to the axis of rotation X.

For the connection of the pin 1 to the thrust bearing 5, the presence of a guide zone 51, defined by two tabs or extensions which substantially form a "V" shape is envisaged.

The height HT of the sensor 3 should not exceed that of the corresponding height HP of the pin 1, so that it does not extend above or below the thrust bearing-pin assembly.

The sensor 3 may consist of a connecting bar 32 having separable means for connection to the shaft 4 (at the shaft's lower end 42) and, at the other end, supporting a fitting 31 which can be inserted in the guide zone 51 to interact with the thrust bearing 5.

Figure 2:
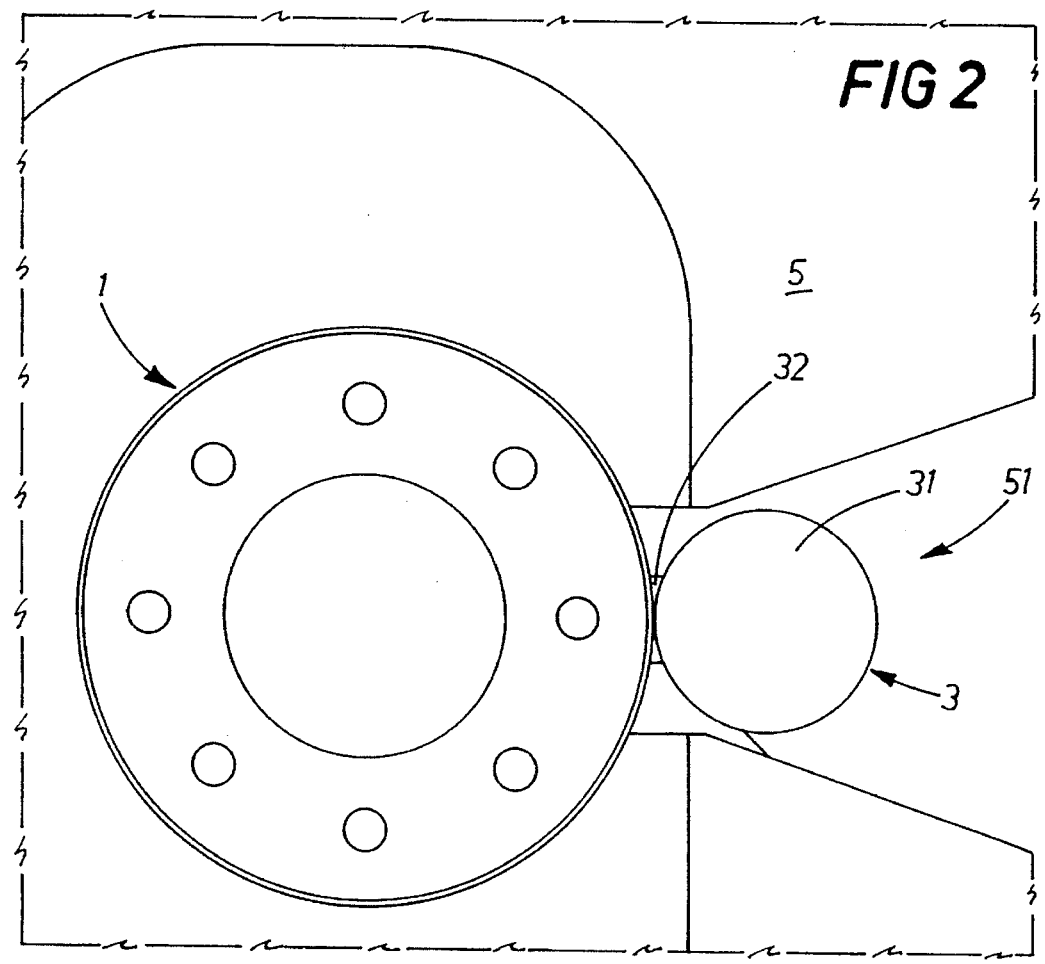
FIG. 2 is a partial schematic plan view of the embodiment shown in FIG. 1.
Figure 3:
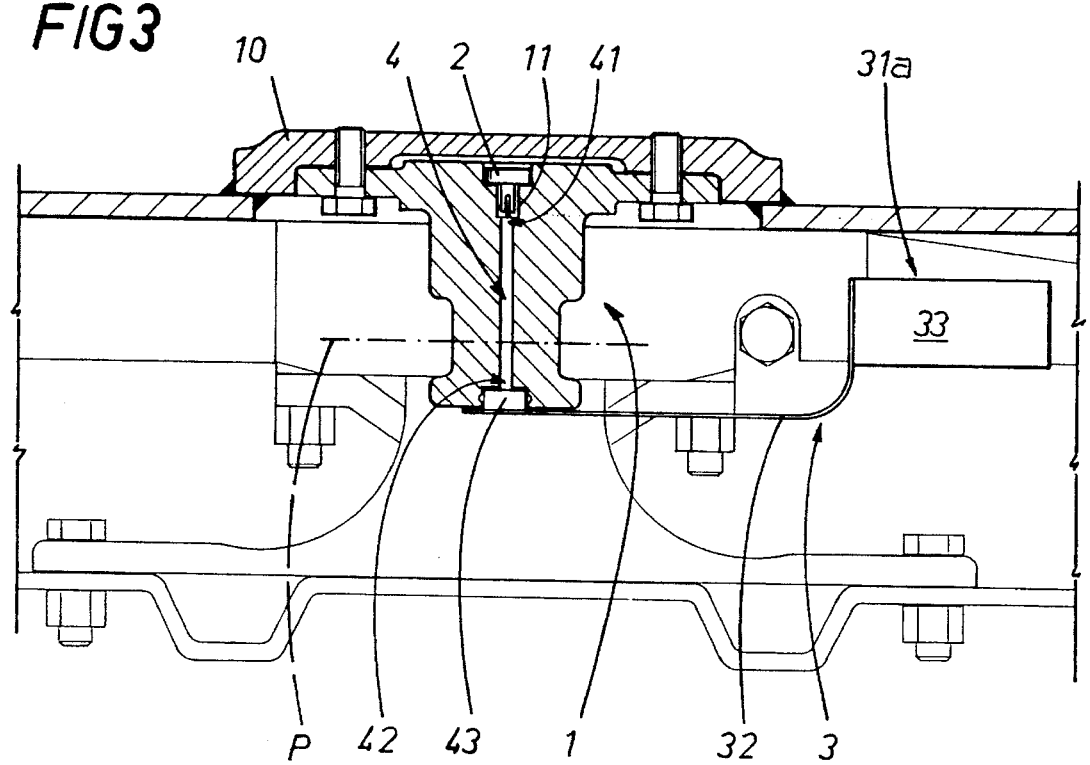
FIG. 3 is a schematic side view with some parts cut away of another embodiment of the present invention.
Figure 4:
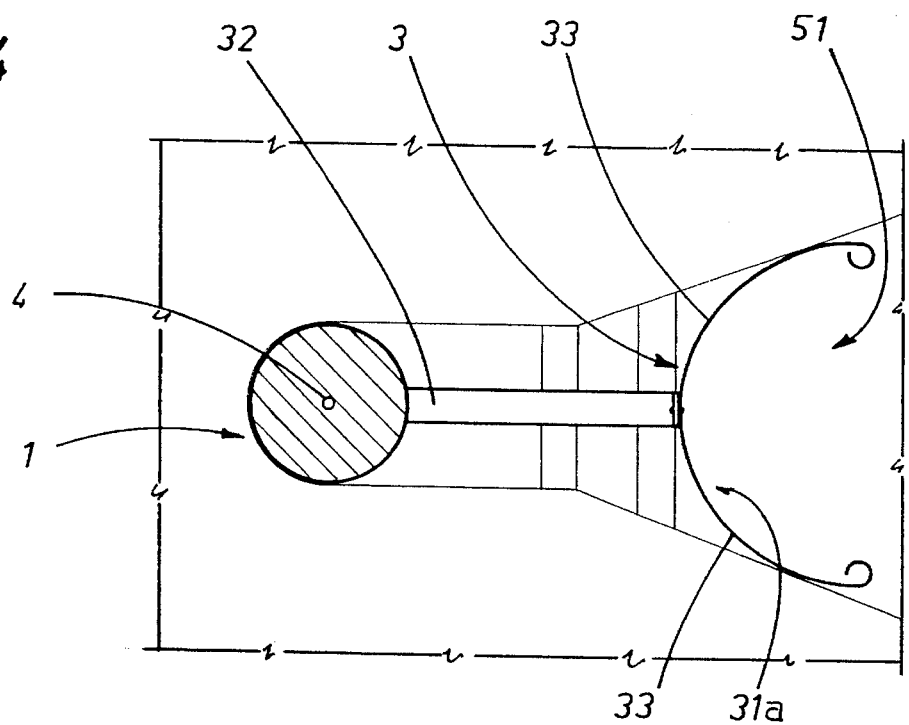
FIG. 4 is a partial schematic plan view of the embodiment shown in FIG. 3.

The fitting may consist of a sealed part 31, as shown in FIGS. 1 and 2, or, as illustrated in FIGS. 3 and 4, may be an open plate 31a. The plate 31a is substantially semi-circular in shape and is fixed at its centre to the connecting bar 32, the concave side facing outwards. The plate is substantially "C"-shaped and is made of a flexible material, preloaded, its respective ends 33 making contact with the two "V"-shaped sections of the guide zone 51, so that it interacts with the latter, reducing the force with which it acts upon the connecting bar 32.

The connection between the thrust bearing 5 and pin 1 is made by means of a hook or jaw 52 on the thrust bearing 5, designed to grip the pin 1 on a plane P perpendicular to the X-axis (the hook or jaw is not illustrated in FIGS. 3 and 4 for greater clarity).

In both embodiments illustrated, the connecting bar 32 can be attached to the shaft below the said plane P (corresponding to the lower end 42 of the shaft 4, with fixing means 43) and extends for a length L not less than the length of the hook 52 from the said X-axis in the direction of the afore-mentioned guide zone 51, so that the said fitting 31 does not interfere with the hook.

The transducer 2 is, preferably, a rotating sensor fitted in a central seat 11 on the pin 1 and attached to the shaft 4 at the top end 41, and equipped with control means designed to determine an angle read by the said rotating sensor, constituting an input variable, which is a function of the rotation between the pin 1 and shaft 4, producing a linear output signal which may be used for the said steering. The transducer 2 may be a potentiometer, an encoder, or similar sensors.

Moreover, FIGS. 3 and 4 show a covering plate 10, designed to cover the top of the transducer 2 and the relative seat 11.

What is claimed is:

1. A steering detection device to determine the angular relationship in a horizontal plane between a truck and a trailer of an articulated vehicle rotatably coupled by a thrust bearing on one of the truck and trailer comprising:

a pin having a generally vertical axis connected to said thrust bearing;

a shaft rotatably mounted to said pin;

a sensor coupled to said shaft to be moved by angular movement of one of the truck and trailer to rotate said shaft upon change in angular relationship between the truck and trailer; and a transducer coupled to said rotatable shaft for producing an electrical signal in response to the rotation of said shaft and corresponding to the angular relationship between the truck and the trailer.

2. The steering detection device according to claim 1, wherein said shaft is positioned at least partially inside and coaxial to the said pin.

3. The steering detection device according to claim 1, wherein said transducer is a rotating sensor positioned in a central seat of said pin and attached to the shaft, said transducer including control means to determine an angle read by said rotating sensor to produce an input variable as a function of the rotation between the pin and shaft and producing a linear electrical output signal.

4. A steering detection device as in claim 1 wherein said pin has a passage and said rotatable shaft is mounted therein, said transducer also being mounted to said pin.

5. A steering detection device as in claim 1 further comprising an extension connected to said shaft to contact a part of the one of the truck and trailer to rotate said shaft.

6. The steering detection device according to claim 5 wherein a part of said thrust bearing coupled to one of the truck and trailer comprises two tabs forming a guide zone of generally "V" shape within which said sensor is placed to be contacted by said tabs and wherein, the height of the said sensor does not exceed the corresponding height of the pin, said sensor comprising a connecting bar having separable means for connection to the shaft at one end and, at the other end, supporting a fitting for insertion in the guide zone to interact with the thrust bearing.

7. The steering detection device according to claim 5, further comprising a hook for connecting the thrust bearing and the pin that grips the pin on a plane perpendicular to the pin axis, said shaft being positioned at least partially within and coaxial to said pin, said connecting bar being attached to said shaft below said plane and extending for a length not less than the length of the said hook from said pin axis in the direction of the guide zone to prevent interference between the fitting and the hook.

8. The steering detection device according to claim 5, wherein a part of said thrust bearing coupled to one of the truck and trailer comprises a pair of tabs on said thrust bearing to establish therebetween a guide zone of generally "V" shape, said sensor further comprising a connecting bar having one end connected to said shaft and at the other end a fitting of a substantially semi-circular plate attached to the connecting bar and flexible so that when preloaded and inserted in the guide zone said fitting interacts with said "V"-shaped tabs.

9. The combination for an articulated vehicle comprising:

a truck;

a trailer having at least one self-steering axle;

a thrust bearing to rotatably couple the truck and trailer;

a pin mounted in a hole in said thrust bearing;

a shaft rotatably mounted to said pin;

a sensor coupled to said shaft to be moved upon angular movement between the truck and trailer to rotate said shaft upon change in angular relationship between the truck and trailer; and a transducer coupled to said rotatable shaft for producing an electrical signal in response to the rotation of said shaft and corresponding to the angular relationship between the truck and the trailer.

10. The combination according to claim 9, wherein said shaft is positioned at least partially inside and coaxial to the said pin.

11. The combination according to claim 9, further comprising an extension connected to said shaft to contact a part of the one of the truck and trailer to rotate said shaft.

12. The combination according to claim 11, wherein a part of said thrust bearing coupled to one of the truck and trailer comprises two tabs forming a guide zone of generally "V" shape within which said sensor is placed to be contacted by said tabs.

* * * * *

UNITED STATES PATENT AND TRADEMARK OFFICE
CERTIFICATE OF CORRECTION

PATENT NO. : 5,536,030
DATED : July 16, 1996
INVENTOR(S) : Marco BETTINI

It is certified that error appears in the above-indentified patent and that said Letters Patent is hereby corrected as shown below:

On the title page, item [30], Foreign Application Priority Data, change "BO94A0174" to --BO94A 000174--.

Signed and Sealed this

Fifteenth Day of October, 1996

Attest:

BRUCE LEHMAN

Attesting Officer    Commissioner of Patents and Trademarks